United States Patent
Lopez et al.

(10) Patent No.: US 9,365,710 B2
(45) Date of Patent: Jun. 14, 2016

(54) POLYPROPYLENE WITH LOW FLUID RETENTION

(71) Applicant: FINA TECHNOLOGY, INC., Houston, TX (US)

(72) Inventors: Margarito Lopez, Pasadena, TX (US); Michael McLeod, Kemah, TX (US)

(73) Assignee: Fina Technology, Inc., Houston, TX (US)

( * ) Notice: Subject to any disclaimer, the term of this patent is extended or adjusted under 35 U.S.C. 154(b) by 562 days.

(21) Appl. No.: 13/676,935

(22) Filed: Nov. 14, 2012

(65) Prior Publication Data

US 2013/0165563 A1     Jun. 27, 2013

Related U.S. Application Data

(60) Provisional application No. 61/578,999, filed on Dec. 22, 2011.

(51) Int. Cl.
    *C08L 23/16*         (2006.01)
    *C08L 23/06*         (2006.01)
    *C08L 23/10*         (2006.01)

(52) U.S. Cl.
    CPC .............. *C08L 23/16* (2013.01); *C08L 23/06* (2013.01); *C08L 23/10* (2013.01)

(58) Field of Classification Search
    CPC .......... C08L 23/06; C08L 23/10; C08L 23/16
    See application file for complete search history.

(56) References Cited

U.S. PATENT DOCUMENTS

| | | | |
|---|---|---|---|
| 6,362,258 B1 | 3/2002 | Avakian et al. | |
| 6,610,792 B2 | 8/2003 | Albe et al. | |
| 2002/0115855 A1* | 8/2002 | Gerster et al. | 544/237 |
| 2003/0216499 A1* | 11/2003 | Oobayashi | 524/396 |
| 2005/0261403 A1* | 11/2005 | Tikuisis et al. | 524/115 |
| 2010/0098586 A1 | 4/2010 | Lopez et al. | |

OTHER PUBLICATIONS

M. Sira, et al., "Surface Modification of Polyethylene and Polypropylene in Atmospheric Pressure Glow Discharge", Journal of Physics D: Applied Physics, Institute of Physics Publishing LTD, GB, vol. 38, No. 4, Feb. 21, 2005, pp. 621-627.
Extended Search Report issued in European Application No. 12888289.1, dated May 4, 2015, 4 pages.
International Preliminary Report on Patentability issued in Application No. PCT/US2012/070355, dated May 28, 2015, 8 pages.
Chinese Office Action issued in Application No. 201280063379.X, dated Nov. 11, 2015, 22 pages.

* cited by examiner

*Primary Examiner* — Peter D Mulcahy
(74) *Attorney, Agent, or Firm* — Albert Shung

(57) ABSTRACT

A controlled rheology polypropylene that is made from Ziegler-Natta produced random copolymer and an additive formulation, extruded in the presence of a peroxide, exhibits low fluid retention and can be used to make medical/laboratory grade equipment, such a pipette tips.

27 Claims, 2 Drawing Sheets

POLYPROPYLENE WITH LOW FLUID RETENTION

CROSS-REFERENCE TO RELATED APPLICATIONS

Not applicable.

FIELD

The present disclosure generally relates to polypropylene and articles made from polypropylene.

BACKGROUND

Polypropylene is generally produced using either a metallocene or a Ziegler-Natta (ZN) catalyst system.

Plastics used in certain laboratory and medical equipment must have low fluid retention and other necessary qualities, including clarity, flexibility, radiation resistance, and autoclavability.

Ziegler-Natta produced polypropylene (ZN-PP) can be prone to warpage in the produced articles, due to its having a wider molecular weight distribution than metallocene produced polypropylene (mPP). In a process known in the art to produce the ZN polypropylene with a narrow molecular weight distribution, the polymers are "vis-broken" in a controlled rheological manner by introducing a specific concentration of a peroxide chemical during extrusion. This controlled rheology polypropylene (CR-PP) can lack some of the performance characteristics of metallocene produced polypropylene, particularly fluid retention. Specifically, additive formulations used in mPP polymers do not achieve the same low fluid retention properties when used in CR-PP.

SUMMARY

Embodiments of the present disclosure generally include controlled rheology polypropylene (CR-PP) made with from 0.01 to 1.0 wt % of an additive formulation. The CR-PP exhibits low fluid retention.

In one embodiment, either by itself or in combination with other embodiments, the controlled rheology polypropylene is made by co-extruding a Zeigler-Natta produced random copolymer of polypropylene with peroxide. The random copolymer can contain less than 1 wt % ethylene, and can be isotactic. The peroxide can be 3,6,9-triethyl-3,6,9,-trimethyl-1,4,7-triperoxonane.

In one embodiment, either by itself or in combination with other embodiments, the additive formulation contains one or more of the following: compounds for radiation resistance, stabilizers, neutralizers, and clarifiers.

Compounds for radiation resistance can be hindered amine light stabilizers. The CR-PP can contain from 0.05 to 0.15 wt % of compound for radiation resistance.

Stabilizers can be diphosphite stabilizers, such as, bis(2,4-dicumylphenyl)pentaerythritol diphosphite. The CR-PP can contain from 0.01 to about 0.2 wt % of stabilizer.

Neutralizers can be stearoyl lactylates, such as calcium stearoyl lactylate. The CR-PP can contain from 0.01 to 0.10 wt % of neutralizer.

Clarifiers can be 1,3,5-Trisamine derivatives, such as N-[3,5-bis-(2,2-dimethyl-propionylamino)-phenyl]-2,2-dimethylpropionamide. The CR-PP can contain from 0.01 to 0.25 wt % of clarifier.

In an embodiment, either by itself or in combination with other embodiments, the controlled rheology polypropylene contains from 0.05 to 0.15 wt % of a hindered amine light stabilizer, from 0.01 to 0.2 wt % of a diphosphite stabilizer, from 0.01 to 0.1 wt % of a stearoyl lactylate, and from 0.01 to 0.25 wt % of a 1,3,5-Trisamide based clarifier.

In an embodiment, either by itself or in combination with other embodiments, the CR-PP has a MFI of from 30 to 50 g/min and molecular weight distribution of 2.0 to about 7.0 polydispersity units. The CR-PP can also exhibit one or more of the following physical features: clarity, good flexibility, radiation resistance, autoclavability, processability, low plate out, non-animal derived additives, non-acetone extractables, non-fluorescence and centrifuge integrity (stiffness/toughness balance).

In an embodiment, either by itself or in combination with other embodiments, the CR-PP is used to make an article. The article can be a medical grade article selected from pipette tips, centrifuge tubes, reaction vessels, protein assay trays, culture tubes, syringes, petri dishes and combinations thereof. In an embodiment, the article is a pipette tip that retains no fluid after 6 passes of the fluid. In an embodiment, the CR-PP exhibits a contact angle of at least 94°, optionally at least 96°, optionally at least 98°.

In another embodiment, either by itself or in combination with other embodiments, the disclosure is a process of making CR-PP exhibiting low fluid retention. The process can includes the following steps: contacting polypropylene and less than 1 wt % ethylene monomer with a Ziegler-Natta catalyst under suitable reaction conditions to form a polymer; combining the polymer with an additive formulation; and extruding the polymer and the additive formulation in the presence of peroxide. The additive formulation can contain additives that are described above. In one embodiment, the additive formulation contains from 0.05 to 0.15 wt % of a hindered amine light stabilizer, from 0.01 to 0.2 wt % of a diphosphite stabilizer, from 0.01 to 0.1 wt % of a stearoyl lactylate, and from 0.01 to 0.25 wt % of a 1,3,5-Trisamide based clarifier.

In an embodiment, either by itself or in combination with other embodiments, the process further includes the step of producing an article from the CR-PP. The article can be a medical grade article selected from pipette tips, centrifuge tubes, reaction vessels, protein assay trays, culture tubes, syringes, petri dishes and combinations thereof. In one embodiment, the article is a pipette tip that retains no fluid after 6 passes of the fluid. In an embodiment, the CR-PP exhibits a contact angle of at least 94°, optionally at least 96°, optionally at least 98°.

BRIEF DESCRIPTION OF DRAWINGS

The present disclosure is best understood from the following detailed description when read with the accompanying figures.

DETAILED DESCRIPTION

Figure 1:
FIG. 1 is a photo of a water droplet on a plaque for measurement of water retention.

The following disclosure provides many different embodiments, or examples, for implementing different features of various embodiments. Specific examples of components and arrangements are described below to simplify the present disclosure. These are, of course, merely examples and are not intended to be limiting.

The present disclosure relates to polypropylene that exhibits low fluid retention and other attributes necessary for use in lab/medical devices and for processes to make such polypropylene.

The polypropylene can be a homopolymer or random copolymer. In an embodiment, either by itself or in combination with other embodiments, the polypropylene is a random copolymer of polypropylene, in which a comonomer is polymerized and randomly distributed in the polypropylene chain. The polypropylene random copolymer can contain from less than 5 wt % of a comonomer, optionally less than 1 wt % of a comonomer. The comonomer can be chosen from the group consisting of $C_2$ to $C_{10}$ olefins. In an embodiment, the comonomer is ethylene.

The polypropylene may display various tacticity. In an embodiment, the polypropylene is isotactic.

The polypropylene can be polymerized using any known catalyst for polypropylene polymerization. In an embodiment, either by itself or in combination with other embodiments, the catalyst is Ziegler-Natta (ZN) catalyst. The Ziegler-Natta catalyst can be any of the conventional ZN catalysts, which are well known in the art. Generally, ZN catalysts comprise a transition metal compound, a support, and a co-catalyst. The transition metal compound can be of the general formula $MR_x$ where M is the metal, R is a halogen or a hydrocarbyloxy and x is the valence of the metal. M can be a Group IVB metal, such as titanium. R can be chlorine, bromine, an alkoxy or a phenoxy. Illustrative examples of the transition metal compounds include $TiCl_4$, $TiBr_4$, $Ti(OC_2H_5)_3Cl$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$. Mixtures of the transition metal compounds may be used. The support can be an inert solid which is chemically unreactive with any of the components of the conventional Ziegler-Natta catalyst. For instance, the support can be a magnesium compound, for example, magnesium halides, dialkoxymagnesiums, alkoxymagnesium halides, dialkylmagnesiums, magnesium oxide, magnesium hydroxide, and carboxylates of magnesium. One example of a transition metal compound and its support is titanium tetrachloride ($TiCl_4$) supported on magnesium dihalide, such as magnesium dichloride or magnesium dibromide. Silica may also be used as a support. The supported catalyst may be employed in conjunction with a co-catalyst or electron donor such as a metal hydride and/or metal alkyl. For instance, the co-catalyst can be an organoaluminum compound, or an alkylaluminum compound, for example, triethylaluminum (TEAl), trimethyl aluminum (TMA) and triisobutyl aluminum (TiBAl). Ziegler-Natta catalyst systems incorporating diethers and succinates may also be used with the disclosure.

The polymerization method can be any of conventional polymerization methods known in the art for the production of polypropylene. Reactor types may include, for example, loop, slurry, solution, gas phase, high pressure processes, continuous stirred tank, or other. Polymerization protocol and reactions conditions, including temperature and pressure, may be determined accordingly. Such polymerizations may be conducted in batch or continuous mode and may take place in one reactor or may be carried out in a series of reactors.

In an embodiment, either by itself or in combination with other embodiments, the polypropylene is a controlled rheology polypropylene (CR-PP), wherein a free radical agent is co-extruded with ZN-PP to degrade, or "vis-break", the polypropylene chains. This process, referred to as controlled rheology or "CR'ing", can increase the polymer's melt flow rate and narrow the molecular weight distribution. The free radical agent can be any known free radical initiator. In an embodiment, the free radical agent is a peroxide, such as 2,2 di(t-amyl)peroxy propane (Lupersol 553 from Lucidol), 3,6,9-triethyl-3,6,9,-trimethyl-1,4,7-triperoxonane (Trigonox 301 from AkzoNobel) or 3,6,6,9,9 pentamethyl-3 n-propyl-1,2,4,5tetraoxacyclononane (Esperal 529 from Peroxygen Division of Witco Chem.) The free radical agent can be used in the amount of from 50 to 10,000 ppm, optionally from 100 to 5000 ppm, optionally from 500 to 2000 ppm. The organic peroxide can be combined with polypropylene particulates or pellets prior to or during extrusion, and the CR'ing takes place during the process of extrusion. The resultant CR-PP can have a MFI of from 20 to 60 g/min, optionally from 25 to 55 g/min, optionally from 30 to 50 g/min. The CR-PP can also have a narrow molecular weight distribution. As used herein, the term "narrow molecular weight distribution" refers to a molecular weight distribution of from about 1.5 to about 8, or from about 2.0 to about 7.5 or from about 2.0 to about 7.0. CR'ing can also modifies other physical properties of the polymer, such as decrease in tensile strength, decrease in stiffness, increase in impact strength, and decrease in warpage.

In an embodiment, either by itself or in combination with other embodiments, the polypropylene contains one or more additives. The additives can include stabilizers, lubricants, clarifiers, acid neutralizers, additives for radiation resistance, ultraviolet screening agents, oxidants, antioxidants, antistatic agents, ultraviolet light absorbents, fire retardants, antiblocks, coefficient of friction modifiers, processing oils, mold release agents, coloring agents, pigments, nucleating agents, fillers, and the like. Additives may be suited for the particular needs or desires of a user or maker, and various combinations of the additives may be used.

Depending on the additive or combination of additives used, the additives can be blended with the polypropylene, by dry blending for instance, after polymerization but prior to extrusion. The additives may also be combined with the polymer during the processing phase (pellet extrusion), for example. In one embodiment, the additives which are useful are those that are not surface active additives or that do not migrate to the surface of the polymer or article. The total amount of additive can comprise from 0.001 to 4.0 wt % by, optionally from about 0.01 to about 2.0 wt %, or optionally from about 0.01 to about 1.0 wt %, based on the total weight of the polymer.

In an embodiment, either by itself or in combination with other embodiments, one or more compounds for radiation resistance can be added to the polymer. Laboratory and medical grade articles, which can be formed from the polypropylene of the disclosure, are typically sterilized. Such sterilization for polypropylene articles can involve gamma radiation. Compounds for radiation resistance include the non-phenolic compounds of benzhydrols or derivatives of benzhydrol. Other compounds for radiation resistance include the hindered amine light stabilizer (HALS) compounds, such as the tetraalkyl-piperidene-containing polytriazine compounds, including the derivatives of 2,2,6,6-tetramethylpiperidine, for example butanedioc acid, dimethylester, polymer with 4-hydroxy-2,2,6,6-tetramethyl-1-piperidine ethanol, sold as Tinuvin 622 by Ciba. Other suitable compounds include poly[[6-[(1,1,3,3-tetramethylbutyl)amino]-1,3,5-triazine-2,4-diyl] [(2,2,6-,6-tetramethyl-4-piperidinyl)imino-1,6-hexanediyl [2,2,6,6-tetramethyl-4-piperidinyl)imino]], which is commercially available as Chimassorb 944, from Ciba, and Univul 5050H sold by BASF. Multiple radiation additives may be used in combination. In an embodiment the total amount of compound for radiation resistance can be from 0.01 to 0.40 wt %, optionally from 0.05 to 0.20 wt %, or optionally from 0.05 to 0.15 wt %, based on the total weight of the polymer.

In an embodiment, either by itself or in combination with other embodiments, one or more stabilizers can be added to the polymer. The stabilizers can help to inhibit oxidation or thermal or ultraviolet light degradation of the end use article. Examples of suitable stabilizers include pentaerythritol tetrakis; tris(2,4-di-tert-butylphenyl)phosphite (sold as Irgafos 168 by Ciba); bis(2,4-dicumylphenyl)pentaerythritol diphosphite (sold as Doverphos 9228 by Dover); 1,3,5-trimethyl-2,4,6-tris(3,5-di-tert-butyl-4-hydroxybenzyl)-benzene (sold as Ethanox 330 by Albemarle); octadecyl-3-(3,5-di-tert-butyl-4-hydroxyphenyl)-propionate (sold as Irganox 1076 by Ciba); synthetic hydrotalcite, such as those with the trade name DHT4A, available from Kyowa Chemical Industries Co.; and combinations thereof. Such compounds can be used in amounts of from about 0.01 to about 0.5 wt %, optionally 0.01 to about 0.4 wt %, optionally 0.01 to about 0.2 wt % based on the total weight of the polymer. Another useful stabilizer is the benzofuran-2-one type compounds.

In an embodiment, either by itself or in combination with other embodiments, one or more neutralizers can be added to the polymer. Neutralizers can be chosen from the group including metal stearates, such as zinc stearate; calcium salts derived from stearic and lactic acids, such as calcium stearoyl lactylate (sold as Pationic 940 by American Ingredients Co.); and calcium pelargonate. In an embodiment neutralizers may be added in the range of from 0.01 to 0.50 wt %, optionally from 0.01 to 0.20 wt %, or optionally from 0.01 to 0.10 wt %, based on the total weight of the polymer.

In an embodiment, either by itself or in combination with other embodiments, one or more clarifiers can be added to the polymer. Clarifiers may also act as nucleating agents. Examples of suitable clarifiers include dibenzylidene sorbitols (CDBS), organophosphate salts, and phosphate esters. Examples of commercially available clarifiers are Millad powdered sorbitols available from Milliken Chemical, such Millad NX8000 and Millad NX8000K; NA-11 and NA-21 phosphate esters available from Asahi Denka Kogyo; NC-4 from Mitsui Chemicals; HPN-68, a norbornane carboxylicacid salt available from Milliken Chemical; and 1,3,5-Trisamide based clarifiers, such as N-[3,5-bis-(2,2-dimethyl-propionylamino)-phenyl]-2,2-dimethylpropionamide (sold as Irgaclear XT386 by Ciba). Other clarifiers known to one skilled in the art can also be used. Clarifiers may also include inorganic nucleating agents (pulverized clay, silicates, alkali salts, alkaline earth salts, aluminum salts, titanium salts, and metal oxides, for example) and organic nucleating agents, such as 2-mercaptobenzimidazole and 1,3,5-trisamide derivatives. In an embodiment clarifiers may be added in the range of from 0.01 to 0.50 wt %, optionally from 0.01 to 0.30 wt %, or optionally from 0.01 to 0.20 wt %, based on the total weight of the polymer.

Other additives include mobilizing agents such as hydrocarbons, halogenated hydrocarbons, phthalates, polymeric fats, vegetable oils, silicone oils, and the like. The additives can also include melt stabilizers (also called secondary stabilizers), which help to prevent degradation during melt processing. The melt stabilizers may be selected from a variety of commercially available phosphate inhibitors and die lubricants, including, for example, metal stearates, fluoropolymers, and their combinations.

In an embodiment, either by itself or in combination with other embodiments, the disclosure is for an additive formulation to be used with CR-PP to produce a polypropylene having low fluid retention. In an embodiment the blend includes from 0.05 to 0.15 wt % of a compound for radiation resistance, from 0.01 to 0.2 wt % of a stabilizer, from 0.01 to 0.1 wt % of a neutralizer, and from 0.01 to 0.2 wt % of a clarifier. In an embodiment, the compound for radiation resistance is a hindered amine light stabilizer, the stabilizer is a diphosphite stabilizer, the neutralizer is a stearoyl lactylate, and the clarifier is a 1,3,5-Trisamide based clarifier.

The CR-PP can be used to make an end use article. In an embodiment, either by itself or in combination with other embodiments, the polymer is used to form a molded article, such as a medical or laboratory grade article. For example, the molded article may include, but is not limited to, a pipette tip, centrifuge tube, reaction vessel, protein assay trays, syringe, petri dish or culture tube. The molded article may be produced using any method known to those of ordinary skill in the art, such as blow molding, compression molding, injection stretch blow molding, etc.

In an embodiment, either by itself or in combination with other embodiments, the article exhibits low fluid retention, in which little or no liquid adheres to the article. Fluid retention can be tested using a water retention test. For instance, if the article is a pipette tip, the water retention test demonstrates the efficiency of the pipette tip to completely dispense all the water from the pipette tip without having any water remaining attached to the inside wall of the tip. The water retention test involves multiple pipetting's of distilled water. The number of pipette passes is defined as the number of times that the distilled water is dispensed from the pipette tip. Each time the water is dispensed from the pipette tip, the pipette tip is visually inspected for fluid retention. For consistency, the pipette tip from the same core in the mold is used for the test. The water retention properties are the same for all pipette sizes and the manner in which the liquid is dispensed from the pipette does not affect the water retention property.

In an embodiment, either by itself or in combination with other embodiments, the CR-PP exhibits low fluid retention properties. Fluid retention properties can be tested using a water contact angle test. In an embodiment, either by itself or in combination with other embodiments, the CR-PP exhibits low water retention properties in which water on a flat plaque of the CR-PP exhibits a contact angle of at least 94°, optionally at least 96°, optionally at least 98°.

In an embodiment, either by itself or in combination with other embodiments, the article is a pipette tip wherein the pipette tip retains only small drops of fluid at the tip of the article after 2 passes of the fluid, or 3 passes, or 4 passes, or 6 passes. Alternatively, the article retains no fluid at the tip of the article after 2 passes of the fluid, or 3 passes, or 4 passes, or 6 passes. In an embodiment, either by itself or in combination with other embodiments, the article passes a water retention test after 6 passes of water. In an embodiment, either by itself or in combination with other embodiments, the article after aging for 6 months passes a water retention test after 6 passes of water.

In an embodiment, either by itself or in combination with other embodiments, the article has desirable physical attributes, including clarity, good flexibility, radiation resistance, autoclavability, processability, low plate out, non-animal derived additives, non-acetone extractables, non-fluorescence and centrifuge integrity (stiffness/toughness balance).

In an embodiment, either by itself or in combination with other embodiments, the article has a haze at 20 mils no greater than 15%, optionally no greater than 11%, optionally no greater than 8%. In an embodiment the article has a haze at 20 mils no greater than 8% and does not fluoresce under UV light.

In an embodiment, either by itself or in combination with other embodiments, the disclosure is a process of making a controlled rheology polypropylene that has low fluid retention, including: contacting polypropylene and less than 1 wt % ethylene monomer with a Ziegler-Natta catalyst under suitable reaction conditions to form a polymer; combining polymer with an additive formulation; and extruding the polymer and additive formulation in the presence of peroxide. The additive formulation can contain one or more of the following: a hindered amine light stabilizer, a diphosphite stabilizer, a stearoyl lactylate, and a 1,3,5-Trisamide based clarifier. In an embodiment the CR-PP can have a MFI of from 30 to 50 g/min and molecular weight distribution of from about 2.0 to about 7.0.

In an embodiment, either by itself or in combination with other embodiments, the process further includes forming the CR-PP into an article. The article can be a molded article, produced using any conventional process, such as injection molding or blow molding. The article can be a medical or laboratory grade article, such a centrifuge tube or pipette tip. In addition to low fluid retention, the article may also exhibit one or more of the following: clarity, good flexibility, radiation resistance, autoclavability, processability, low plate out, non-animal derived additives, non-acetone extractables, non-fluorescence and centrifuge integrity (stiffness/toughness balance).

The following Example is meant to be merely illustrative of a particular embodiment of the present disclosure, and is by no means limiting of the scope of the disclosure.

Four samples of CR-PP containing different combinations of additives were produced and tested for physical properties. For each sample, a 2.8 to a 3.9 g/10 min melt flow rate reactor grade random copolymer polypropylene fluff sample that contained 0.6 wt % ethylene as a co-monomer was CR'ed to a polypropylene with a melt flow rate range of 40 to 50 g/10 min. The peroxide Trigonox 301 was used for the controlled rheology. The following additives were used in one or more of the CR-PP samples: Chimmasorb 944, Tinuvin 622, Irgafos 168, Univul 5050H, Doverphos s-9228T, calcium pelargonate, Pationic 940, Vegetable calcium stearate, Millad NX8000, Millad NX8000K, Irgaclear XT386.

The following table shows the amount of various additives and physical properties for each sample.

TABLE 1

Additives and physical properties for CR-PP samples.

| | Sample | | | |
|---|---|---|---|---|
| | CR-PP A | CR-PP B | CR-PP C | CR-PP D |
| Additives (wt %) | | | | |
| Radiation Resistance | | | | |
| Tinuvin 622 | 0.08 | | | 0.06 |
| Chimmasorb 944 | 0.04 | | | 0.03 |
| Univul 5050H | | 0.09 | 0.09 | |
| Stabilizer | | | | |
| Irgafos 168 | 0.10 | | | |
| Doverphos S-9228T | | 0.03 | 0.03 | 0.03 |
| Neutralizer | | | | |
| Calcium Pelargonate | | | | 0.03 |
| Pationic 940 | | 0.03 | 0.03 | |
| Veg. ZnSt | 0.09 | | | |
| Clarifier | | | | |
| NX8000 | 0.19 | | | |
| NX8000K | | | 0.19 | 0.19 |
| Irgaclear XT386 | | 0.02 | | |
| Total Additives (wt %) | 0.5 | 0.17 | 0.34 | 0.34 |
| Trigonox 301 (ppm) | 1100 | 1100 | 1100 | 1100 |
| Base Fluff MFR (g/min) | 2.9 | 3.9 | 3.9 | 3.9 |
| Pellet MFR (g/min) | 44.8 | 50.3 | 51.3 | 51 |
| Color Hunter b | −2.84 | −0.43 | −1.91 | −1.85 |
| Color Y.I. | −8.44 | −1.77 | −6.23 | −5.96 |
| % Haze at 20 mils thickness | 9 | 6 | 12 | 12 |
| % Haze at 40 mils thickness | 26 | 15 | 26 | 27 |
| % Haze at 60 mils thickness | 29 | 27 | 35 | 35 |

The four samples were also molded into pipette tips and centrifuge tubes and tested for fluid retention, fluorescence, static buildup, and clarity. The following table shows the results of those tests.

TABLE 2

Fluid retention and other properties of CR-PP A-D.

| | Sample | | | |
|---|---|---|---|---|
| | CR-PP A | CR-PP B | CR-PP C | CR-PP D |
| Fluid Retention (10 passes) | Fail | Pass | Pass | Pass |
| Fluid Retention after six months (10 passes) | Fail | Pass | Fail | Fail |
| Fluorescence | Fail | Pass | Fail | Fail |
| Static Buildup | Pass | Pass | Pass | Pass |
| Clarity | Good | Exceptional | Good | Good |

A sample passed the fluid retention test if it retained no fluid in the pipette tip after at least five passes of fluid. The sample CR-PP B, containing the additives Univul 5050H, Doverphos S9228T, Pationic 940, and Irgaclear XT386, performed the best. It was the only sample to pass the fluid retention test after aging for six months. The Irgaclear XT386 clarifier, formulation CR-PP B, was the only formulation that did not fluoresce under UV light. Sample CR-PP B also passed the requirements for flexibility, radiation resistance, autoclavability, processability, no plate out, non-animal derived additives, non-acetone extractables, and centrifuge integrity. Thus, ZN-PP can be CR'ed and formed with a combination of additives to achieve a polypropylene with low fluid retention and other desired qualities.

A water contact angle test was performed to quantify fluid retention values. Surface energy determines a polymers interaction with a liquid. Surface Energy is the intermolecular bonds or forces between two materials. The first ten angstroms into a surface is where surface energy is determined. It can be measured by contact angles between the fluid and the surface. Contact angle is defined as the behavior of pure water on a surface as a result of tensions between a liquid and solid surrounded by vapor. It usually involves only water, low variability, and can be utilized on several surfaces. With the use of the CAM-PLUS MIRCO contact angle instrument in conjunction with the Hirox Digital Microscope, contact angle was utilized to determine the surface tension values of several polymeric materials. The instrument utilized was a CAM-PLUS MIRCO contact angle setup and a digital microscope. The lens operated on the microscope was a MXG-5040RZ with a AD-5040HS adapter. Contact angle was measured with deionized water.

Figure 2:
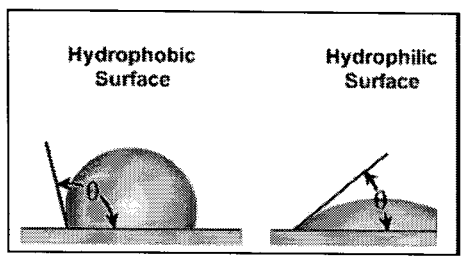
FIG. 2 is an illustration depicting a contact angle on a hydrophilic surface and a hydrophobic surface.

FIG. 1 is a photo of a water droplet on a plaque for measurement. FIG. 2 illustrates how a low contact angle indicates a hydrophilic surface that would tend to retain fluid on its surface, while a high contact angle indicates a hydrophobic surface that would tend to not retain fluid on its surface and thus have lower fluid retention values.

Figure 3:
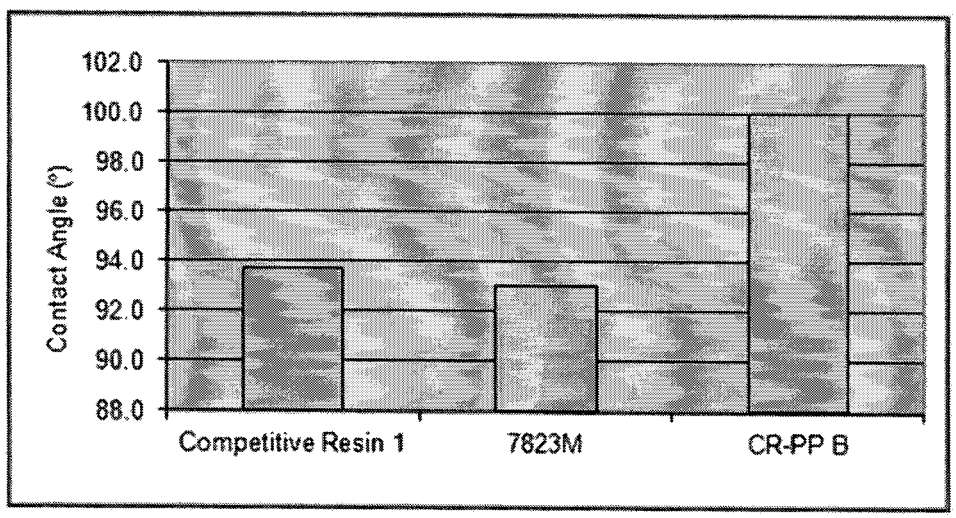
FIG. 3 is a graph of relative contact angles for polypropylenes described in the Example.

Samples CR-PP A and CR-PP B along with TOTAL 7823M a commercially available PP available from Total Petrochemicals, Inc. were injected molded into plaques and tested for water contact angle. A higher contact angle indicates a reduced fluid retention property. The CR-PP A had a contact angle of 93.6°, CR-PP B had a contact angle of 100.0°, 7823M had a contact angle of 93.0°. The contact angle measurements showed that CR-PP B exhibited the highest contact angle, which would indicate lower wettability properties. These results are shown in FIG. 3.

Contact angle measurement was taken on the top side of plaques and a 15 um droplet. The following equation was applied to calculate the contact angle:

$$\theta = 2 \arctan(H/R)$$

Figure 4:
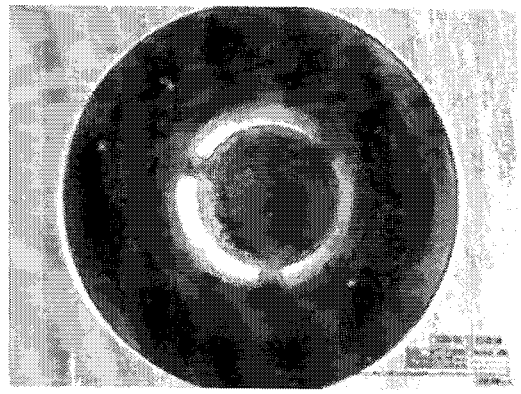
FIG. 4 is a photo of the sapphire standard used as a calibration standard for measurement of contact angles.
Figure 4:
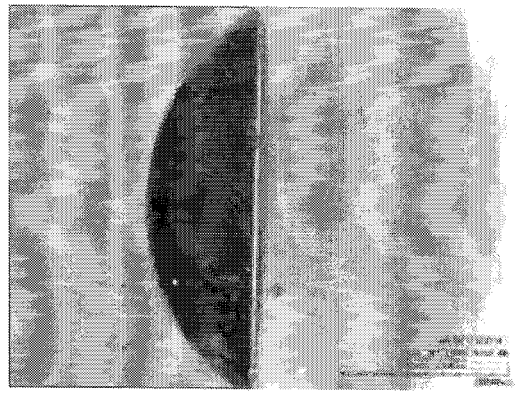

Where:
$\theta$=Contact angle
H=height of droplet's image
R=half its width or diameter A sapphire standard was used to calibrate the microscope and confirm the measuring technique for contact angle. The sapphire standard was made with a contact angle of 60.0°±1. After taking several measurements with the microscope the average was 59.0°. This sapphire standard verified that the technique employed was yielding accurate results. FIG. 4 is a photo of the sapphire standard used as a calibration standard.

TABLE 1

Sapphire Standard Contact Angle
Sapphire Standard (Using AD-5040SS)

| Trial | Diameter (microm) | Height (microm) | Contact Angle (°) |
|---|---|---|---|
| 1 | 4738 | 1369 | 60.0 |
| 2 | 4724 | 1334 | 58.9 |
| 3 | 4697 | 1323 | 58.8 |
| 4 | 4708 | 1319 | 58.5 |
| 5 | 4712 | 1319 | 58.5 |
| | Average | | 59.0 |

As used herein, the term "autoclavability" refers to a physical property wherein an article is formed from a polymer that is resistant to softening at elevated temperatures during sterilization by autoclaving, commonly at 120° C. or higher.

As used herein, the term "low plate out" refers to resistance to plate out. Plate-out occurs when material deposits on the mold (cores, cavities, or vents) during the molding of a part. The residue that deposits onto the mold is also referred to as plate-out. As used herein "low" plate out can refer to a composition exhibiting low or no plate out.

As used herein, the term "radiation resistance" refers to a physical property wherein an article is formed from a polymer that is resistant to gamma radiation or electron beam radiation during sterilization in the presence of oxygen, therefore decreasing the severity of embrittlement and discoloration that normally occurs during and after such sterilization. Accordingly, as used herein, articles exhibiting radiation resistance generally exhibit a resistance (no increased embrittlement or discoloration) to at least 5 mega rads $Co^{60}$ of radiation.

As used herein, the term "water retention test" refers to the efficiency of a pipette tip to completely dispense all the liquid from the pipette tip without having any noticeable liquid remaining attached to the inside wall of the tip. The water retention test involves multiple pipetting of distilled water. The number of pipette passes is defined as the number of times that the distilled water was dispensed from the pipette tip. Each time the water was dispensed from the pipette tip, the pipette tip was visually inspected for water retention. The water retention properties are the same for all pipette sizes. The water can be dispensed from the pipette by any suitable method, such as via gravity drain, air displacement, positive displacement, etc. The manner in which the liquid is dispensed from the pipette does not affect the water retention property.

The various embodiments of the present disclosure can be joined in combination with other embodiments of the disclosure and the listed embodiments herein are not meant to limit the disclosure. All combinations of embodiments of the disclosure are enabled, even if not given in a particular example herein.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

While the foregoing is directed to embodiments, versions and examples of the present disclosure, which are included to enable a person of ordinary skill in the art to make and use the disclosures when the information in this patent is combined with available information and technology, the disclosure is not limited to only these particular embodiments, versions and examples. Also, it is within the scope of this disclosure that the aspects and embodiments disclosed herein are usable and combinable with every other embodiment and/or aspect disclosed herein, and consequently, this disclosure is enabling for any and all combinations of the embodiments and/or aspects disclosed herein. Other and further embodiments, versions and examples of the disclosure may be devised without departing from the basic scope thereof and the scope thereof is determined by the claims that follow.

What is claimed is:

1. A controlled rheology polypropylene comprising an additive formulation, wherein the additive formulation comprises from 0.05 to 0.15 wt % of a radiation resistance compound comprising a hindered amine light stabilizer, from 0.01 to 0.2 wt % of a stabilizer comprising a diphosphite stabilizer, from 0.01 to 0.1 wt % of a neutralizer comprising a stearoyl lactylate, and from 0.01 to 0.25 wt % of a clarifier comprising N-[3,5-bis-(2,2-dimethyl-propionylamino)-phenyl]-2,2-dimethylpropionamide clarifier, based on the weight of the controlled rheology polypropylene, and wherein the controlled rheology polypropylene exhibits low fluid retention, wherein fluid retention is measured by a water contact test in which water on a flat plaque of the controlled rheology polypropylene exhibits a contact angle of at least 94°.

2. The controlled rheology polypropylene of claim 1 made using Ziegler-Natta produced polypropylene and a peroxide.

3. The controlled rheology polypropylene of claim 2, wherein the Ziegler-Natta produced polypropylene is a polypropylene random copolymer, which comprises propylene and less than 1 wt % ethylene.

4. The controlled rheology polypropylene of claim 2, wherein the peroxide is 3,6,9-triethyl-3,6,9,-trimethyl-1,4,7-triperoxonane.

5. The controlled rheology polypropylene of claim 1, wherein the melt flow index of the controlled rheology polypropylene is from 30 to 50 g/min.

6. The controlled rheology polypropylene of claim 1, wherein the molecular weight distribution of the controlled rheology polypropylene is from about 2.0 to about 7.0 polydispersity units.

7. The controlled rheology polypropylene of claim 1, wherein the additive formulation is from 0.01 to 1.0 wt % based on the weight of the controlled rheology polypropylene.

8. The controlled rheology polypropylene of claim 1, wherein the additive formulation comprises from 0.05 to 0.12 wt % of the hindered amine light stabilizer, from 0.01 to 0.06 wt % of the diphosphite stabilizer, from 0.01 to 0.06 wt % of the stearoyl lactylate, and from 0.01 to 0.06 wt % of the 1,3,5-Trisamide based clarifier, based on the weight of the controlled rheology polypropylene, wherein the additive formulation is no more than 0.30 wt % of the controlled rheology polypropylene and wherein the controlled rheology polypropylene exhibits low plate out, radiation stability, autoclavability, does not fluoresce under UV light, and a has a haze at 20 mils no greater than 8%.

9. An article comprising the controlled rheology polypropylene of claim 1.

10. The article of claim 9, wherein the article exhibits low plate out, radiation stability and autoclavability, and a haze at 20 mils no greater than 8%.

11. The article of claim 9, wherein the clarifier comprises N-[3,5-bis-(2,2-dimethyl-propionylamino)-phenyl]-2,2-dimethylpropionamide, wherein the article does not fluoresce under UV light, and wherein the article has a haze at 20 mils no greater than 8%.

12. The article of claim 9, wherein the article is a medical grade article selected from pipette tips, centrifuge tubes, reaction vessels, protein assay trays, culture tubes, syringes, petri dishes and combinations thereof.

13. The article of claim 9, wherein the article is a pipette tip that passes a water retention test after 6 passes of water.

14. The article of claim 9, wherein the article is a pipette tip that has aged for at least 6 months and passes a water retention test after 6 passes of water.

15. The controlled rheology polypropylene of claim 1, having low fluid retention properties in which water on a flat plaque of the polypropylene exhibits a contact angle of at least 98 °.

16. A process of making a controlled rheology polypropylene comprising:
contacting polypropylene and less than 1 wt % ethylene monomer with a Ziegler-Natta catalyst under suitable reaction conditions to form a polymer;
combining the polymer with 0.01 to 1.0 wt % of an additive formulation, wherein the additive formulation comprises from 0.05 to 0.15 wt % of a radiation resistance compound comprising a hindered amine light stabilizer, from 0.01 to 0.2 wt % of a stabilizer comprising a diphosphite stabilizer, from 0.01 to 0.1 wt % of a neutralizer comprising a stearoyl lactylate, and from 0.01 to 0.25 wt % of a clarifier comprising a N-[3,5-bis-(2,2-dimethyl-propionylamino)-phenyl]-2,2-dimethylpropionamide clarifier, based on the weight of the controlled rheology polypropylene;
and extruding the polymer and the additive formulation in the presence of peroxide.

17. The process of claim 16, wherein the controlled rheology polypropylene has a melt flow index from 30 to 50 g/min and a molecular weight distribution of from about 2.0 to about 7.0 polydispersity units.

18. The process of claim 16, further comprising the step of forming the controlled rheology polypropylene into an article.

19. The process of claim 18, wherein the article exhibits low plate out, radiation stability and autoclavability.

20. The process of claim 18, wherein the article is a medical grade article selected from pipette tips, centrifuge tubes, reaction vessels, protein assay trays, culture tubes, syringes, petri dishes and combinations thereof.

21. The process of claim 18, wherein the article is a pipette tip that passes a water retention test after 6 passes of water.

22. The process of claim 18, wherein a plaque of the controlled rheology polypropylene exhibits low fluid retention properties in which water on a flat plaque of the polypropylene exhibits a contact angle of at least 94°.

23. The controlled rheology polypropylene of claim 1, wherein the radiation resistance compound comprises poly [[6-[(1,1,3,3-tetramethylbutyl)amino]-1,3,5-triazine-2,4-diyl][(2,2,6-, 6-tetramethyl-4-piperidinyl)imino-1,6-hexanediyl[2,2,6, 6-tetramethyl-4-p-iperidinyl)imino]].

24. The controlled rheology polypropylene of claim 1, wherein the stabilizer comprises bis(2,4-dicumylphenyl)pentaerythritol diphosphite.

25. The controlled rheology polypropylene of claim 1, wherein the neutralizer comprises calcium stearoyl lactylate.

26. The controlled rheology polypropylene of claim 3, wherein the radiation resistance compound comprises poly [[6-[(1,1,3,3-tetramethylbutyl)amino]-1,3,5-triazine-2,4-diyl][(2,2,6-, 6-tetramethyl-4-piperidinyl)imino-1,6-hexanediyl[2,2,6,6-tetramethyl-4-p-iperidinyl)imino]];
wherein the stabilizer comprises bis(2,4-dicumylphenyl) pentaerythritol diphosphite;
wherein the neutralizer comprises calcium stearoyl lactylate; and
wherein the clarifier comprises N-[3,5-bis-(2,2-dimethyl-propionylamino)-phenyl]-2,2-dimethylpropionamide.

27. The controlled rheology polypropylene of claim 26, wherein the peroxide is 3,6,9-triethyl-3,6,9,-trimethyl-1,4,7-triperoxonane.

\* \* \* \* \*